(12) United States Patent
Szabo et al.

(10) Patent No.: US 9,825,841 B2
(45) Date of Patent: Nov. 21, 2017

(54) METHOD OF AND NETWORK SERVER FOR DETECTING DATA PATTERNS IN AN INPUT DATA STREAM

(75) Inventors: Geza Szabo, Kecskemet (HU); Wesley Davison Braga Melo, Recife (BR); Gabor Sandor Enyedi, Budapest (HU); Stenio Fernandes, Recife (BR); Gergely Pongrácz, Budapest (HU); Djamel Sadok, Joboatão dos Guararapes (BR)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 299 days.

(21) Appl. No.: 14/411,547

(22) PCT Filed: Jun. 29, 2012

(86) PCT No.: PCT/EP2012/062756
§ 371 (c)(1),
(2), (4) Date: Jan. 20, 2015

(87) PCT Pub. No.: WO2014/000819
PCT Pub. Date: Jan. 3, 2014

(65) Prior Publication Data
US 2015/0156102 A1 Jun. 4, 2015

(51) Int. Cl.
*G06F 15/16* (2006.01)
*H04L 12/26* (2006.01)
*H04L 12/851* (2013.01)
*H04L 29/06* (2006.01)

(52) U.S. Cl.
CPC .......... *H04L 43/50* (2013.01); *H04L 47/2483* (2013.01); *H04L 63/1408* (2013.01)

(58) Field of Classification Search
CPC .. H04L 43/50; H04L 47/2483; H04L 63/1408
(Continued)

(56) References Cited

U.S. PATENT DOCUMENTS 6,856,981 B2 * 2/2005 Wyschogrod ..... G06F 17/30985
706/48
7,991,723 B1 8/2011 Dubrovsky et al.
(Continued)

FOREIGN PATENT DOCUMENTS

JP 4565064 B2 8/2010

OTHER PUBLICATIONS

Sun et al., NFA-based Pattern Matching for Deep Packet Inspection, 2011 Proceedings of 20th International Conference on Computer Communications and Networks (ICCCN), 2011, pp. 1-6, DOI: 10.1109/ICCCN.2011.6006095.*
(Continued)

*Primary Examiner* — Moustafa M Meky
*Assistant Examiner* — Thorne E Waugh
(74) *Attorney, Agent, or Firm* — Patent Portfolio Builders, PLLC

(57) ABSTRACT

Computer controlled method, network server (42, 43, 44, 46, 48) and system (40) for detecting data patterns in a data stream (36) received by a computer (30). The data stream (36) comprising a plurality of data symbols. The computer (30) executes a finite automata (10) comprising a plurality of states (11, 12, 13, 14, 15) including a start state (11) and at least one accepting state (15). State transitions (16) are triggered by a data symbol (17a) according to a state transition register (17) and the method comprises the steps of determining (21), by the computer (30), from a data symbol register (18) whether a data symbol of the data stream (36) is comprised in a group of data symbols not resulting in an accepting state (15), and triggering (22), by the computer (30), a transition (16) to the start state (11) for data symbols comprised in the group and a transition (23) to a state (12, 13, 14, 15) according to the state transition register (17) for detecting the data pattern otherwise.

14 Claims, 3 Drawing Sheets

(58) Field of Classification Search
USPC .................................................. 709/223–230
See application file for complete search history.

(56) References Cited

U.S. PATENT DOCUMENTS

| | | | | |
|---|---|---|---|---|
| 8,364,833 | B2 * | 1/2013 | Bennett | H04L 63/0245 370/465 |
| 8,484,147 | B2 * | 7/2013 | Clark | G06F 21/552 706/46 |
| 9,021,582 | B2 * | 4/2015 | Goldman | H04L 63/0245 726/22 |
| 9,203,805 | B2 * | 12/2015 | Goyal | H04L 63/0254 |
| 2005/0108554 | A1 | 5/2005 | Rubin et al. | |
| 2008/0046423 | A1 | 2/2008 | Khan Alicherry et al. | |
| 2010/0174770 | A1 | 7/2010 | Pandya | |
| 2010/0198850 | A1 * | 8/2010 | Cytron | G06F 17/30985 707/758 |

OTHER PUBLICATIONS

Sun et al., DFA-Based Regular Expression Matching on Compressed Traffic, 2011 IEEE International Conference on Communications (ICC), 2011, pp. 1-5, DOI: 10.1109/icc.2011.5962596.*

Ganegedara et al., Automation Framework for Large-Scale Regular Expression Matching on FPGA, 2010 International Conference on Field Programmable Logic and Applications, 2010, pp. 50-55, DOI: 10.1109/FPL.2010.21.*

Yamagaki et al., High-speed regular expression matching engine using multi-character NFA, 2008 International Conference on Field Programmable Logic and Applications, 2008, pp. 131-136, DOI: 10.1109/FPL.2008.4629920.*

Vespa et al., GPEP: Graphics Processing Enhanced Pattern-Matching for High-Performance Deep Packet Inspection, 2011 International Conference on Internet of Things and 4th International Conference on Cyber, Physical and Social Computing: 2011, pp. 74-81, DOI: 10.1109/iThings/CPSCom.2011.36.*

Uga et al., A fast and compact longest match prefix look-up method using pointer cache for very long network address, 0-7803-5794-9/99/$10.00 0 1999 IEEE, pp. 595-602.*

Antonello, Rafael et al., "Deterministic Finite Automaton for Scalable Traffic Identification: the Power of Compressing by Range", IEEE 2012, Proceedings of the Network Operations and Management Symposium, Apr. 16, 2012, 155-162.

* cited by examiner

METHOD OF AND NETWORK SERVER FOR DETECTING DATA PATTERNS IN AN INPUT DATA STREAM

TECHNICAL FIELD

The present invention relates to data processing and, in particular to a computer controlled method for data pattern detection in an input data stream.

BACKGROUND

The amount of data transmitted over telecommunications networks increases rapidly. High speed and high capacity packet data networks and servers are employed for transferring these data. Amongst others for test and monitoring purposes, to guarantee a desired or agreed Quality of Service, QoS, for example, packet header information on, for example, source and destination addresses is not sufficient to obtain the required information. In some cases the payload of data packets needs to be inspected for particular data patterns, for example. Data mining, detection of data viruses and other malicious data are further examples that may require packet data inspection.

A method of inspecting packets is by employing finite automata. A finite automata, or simply a state machine, is a computer controlled method that is employed as an abstract state machine operating on states according to a state transition table or state transition register. Such state transition table comprises—for a plurality of states of the finite automata—a transition from a present to a next state upon inputting a particular data symbol in the present state, eventually leading to a data pattern match of a particular string of input data symbols. Such data symbols are, for example, the data symbols comprised in the well-known American Standard Code for Information Interchange, or in short the ASCII table. As such, a state transition to a subsequent state may also involve a transition to the same state of the automata, called a non-forwarding transition. Processing finite automata may involve relatively high memory storage and memory access, dependent on the complexity of the automata, i.e. the number of states, state transitions and the dimensions of the state transition table.

In general, two types of finite automata can be distinguished. Deterministic Finite Automata, DFA, and Non-deterministic Finite Automata, NFA. DFA is preferred at processing speed, as it requires only constant amount of memory accesses while parsing thru the packet payload. The cost of such computation efficiency is the high memory storage. NFA has lower memory storage requirements but as from every state the next state can be several other in parallel, it requires a lot of computation resources to check every possible case.

Both DFA and NFA have their own strengths and weaknesses and can be employed in software tools for data packet inspection systems.

Network servers performing the finite automata comprise a certain amount of memory which can be classified in a plurality of memory levels. These have their own characteristics in terms of throughput and latency. In most parallel systems at least L1 and L2 type memory are present. L1 is most often dedicated to a single core of the multicore execution unit, and L2 is most often shared over a plurality of cores. As such however, the number of parallel read/write instructions are limited by the number of memory controllers.

Even within the same level of memory such differences can be present, as sometimes different types of memory are combined in single server. In case of real-time packet processing several packets are processed at the same time, usually by utilizing multicore execution units or other parallel hardware. Care should be taken to not completely occupy al of the memory resources with executing the finite automata. Especially as most finite automata are executed in a network server also serving other network and communication tasks.

As the amount of data transmitted over telecommunications networks increases rapidly, software employing conventional DFA of FNA may require a too high amount of resources, i.e. memory storage and memory access controllers, generally designated as memory footprint. Accordingly, there is a need for improved methods of detecting data patterns executing finite automata.

SUMMARY

It is an object of the present invention to provide an improved computer controlled method for detecting data patterns in an input data stream.

It is, in particular, an object of the present invention to provide a computer controlled method for detecting data patterns arranged for executing a finite automata on high-speed data streams.

In a first aspect, a computer controlled method is provided for detecting data patterns in a data stream received by the computer. The data stream comprising a plurality of data symbols. The computer executing a finite automata comprising a plurality of states including a start state and at least one accepting state, and state transitions triggered by a data symbol according to a state transition register. The method comprises the steps of:

determining, by the computer, from a data symbol register whether a data symbol of the data stream is comprised in a group of data symbols not resulting in an accepting state;

triggering, by the computer, a transition to the start state for data symbols comprised in the group, and triggering, by the computer, a transition to a state according to the state transition register for detecting the data pattern otherwise.

Upon processing data streams the data symbols comprised therein are compared to find a match on a data pattern with use of the finite automata. As often no data patterns are searched comprising non human-readable printable data symbols, for example, one can expect that for such data symbols the finite automata will not result in a match on a data pattern. Using this insight a more focussed and efficient method for detecting data patterns is constructed.

More particularly, during execution of the steps of the finite automata according to its state transition table, there are cases wherein the input, i.e. the data symbol of the data stream to be inspected, puts the finite automata in the start state, as there would be no transition leading to an accepting state and therewith a match on a data pattern. Combining a collection of data symbols into a group that always leads to the start state and automatically triggering a transition to the start state for each data symbol of the data stream comprised in this group, significantly reduces automata walkthrough and thereby memory footprint of the finite automata. As such an improved method of detecting data patterns in an input data stream is obtained.

In a further example the data symbol register comprises the group of data symbols not resulting in an accepting state.

The step of determining comprises determining whether a data symbol of the data stream is comprised in the data symbol register.

The step wherein the computer determines whether a data symbol of the received data stream is a data symbol that does not result in an accepting can be employed in several ways. The data symbol register can, for example, be comprised, solely, of the group of data symbols not resulting in an accepting state. The advantage of such a data symbol register is that is contains the least amount of data, i.e. only those data symbols for which the start state is to be triggered. The computer performing the method determines whether a data symbol of the data stream is comprised in the data symbol register. If it is present therein, the computer can trigger a transition to the start state. If not, the computer can trigger a transition to the same state, also known as a non-forwarding state, or to a subsequent state according to the state transition register. As such, the finite automata walkthrough is continued accordingly.

In another example the data symbol register comprises the plurality of data symbols. The data symbols not resulting in an accepting state are comprised in a marked group in the data symbol register. The step of determining comprises determining whether a data symbol register is comprised in the marked group.

The data stream being received by the computer comprises a plurality of data symbols. These symbols can be characters or strings comprising characters corresponding to the data comprised in the payload. As such, some data, e.g. protocol data comprises different symbols than pure text data. However, these symbols are comprised in a symbol set, i.e. an alphabet, being a definite set of symbols. Such alphabets or symbol sets can comprise e.g. all 128 ASCII symbols or all 256 extended ASCII symbols.

The data symbol register can in an example be comprised of the definite set of all symbols that can be comprised in the data stream. For example, according to the example above, the definite set of symbols can be the extended ASCII alphabet of 256 symbols. As such, the data symbol register comprises all 256 symbols. Further, the data symbol register comprises information to identify the group of symbols that do not result in an accepting state. Such information can be contained in the register by marking or flagging those symbols comprised in that group. Plural methods are known in the art to set such flags or marks.

In another example the data stream is processed, by the computer, in accordance with the detected data pattern. The computer performing the method can be employed for plural services. For example, to filter traffic in a gateway setting. As such, the method can be performed by the computer to detect unwanted traffic in the data stream. The data stream is received by the computer and matched according to data patterns. If a pattern is matched, and as such, unwanted traffic is detected, the computer can perform a further action on the data stream. Depending on the patterns the proper action can be performed. For example, data matching on unwanted protocols or viruses, can be dropped or rerouted.

In a further example the group of data symbols are generated, by the computer, to comprise data symbols in accordance with an application to be processed on the computer. As mentioned, the computer can be a computer performing a certain task in a telecommunication network. For example a serving node of a mobile telecommunications network responsible for routing data packets to and from mobile stations such as mobile phones. Such serving nodes are arranged to route certain data packets wherein the protocols contained in the payload are determined by the network. As such, there is knowledge about what symbols are to be expected in the data stream as for example not all extended ASCII symbols are used by these protocols. Accordingly, a group of data symbols not resulting in an accepting state can be generated according to the function of the computer in the network. If such a function is limited to routing data streams comprised in particular mobile protocols, the group of symbols can contain those symbols which are absent in these protocols.

In yet another example, the method is operated in a network server of a telecommunications system. Telecommunications systems comprise plural servers performing plural tasks. The method can be operated in a plurality of servers comprised in such a system wherein a stream of data is received, transmitted, rerouted or processed in another way. Examples of network servers wherein the method can be operated, are radio base stations, Serving GPRS Support Nodes (SGSN), Gateway GPRS Support Node (GGSN), Broadband Remote Access Servers (BRAS), Digital Subscriber Line Access Multiplexers (DSLAM), or the like.

In a second aspect a computer program product comprises a data storage device storing computer program code data arranged for performing the method according to an example described above, wherein the program code data are loaded into a memory of an electronic processing unit and are executed by the electronic processing unit.

In a third aspect a network server operates in a telecommunications network for detecting a data pattern in a data stream comprising a plurality of data symbols. The network server comprises;
  a state transition register defining a finite automata comprising a plurality of states including a start state and at least one accepting state, and state transitions triggered by a data symbol according to the state transition register;
  a data symbol register, comprising data symbols;
  a determining unit, for determining from the data symbol register, whether a data symbol of the data stream is comprised in a group of data symbols not resulting in an accepting state; and
  an execution unit, for triggering a state transition to the start state for data symbols comprised in the group, and a state transition to a state according to the state transition register for detecting the data pattern otherwise.

A network server operating in a telecommunications network comprises several units. Amongst which units to perform the initial or primary tasks of the network server, such as routing data to a plurality of nodes within the network. Further, when employed as a network server according to an aspect of the invention, it comprises a state transition register, a data symbol register, a determining unit and an execution unit. The execution unit is a unit comprising a single or multicore processor for performing the servers initial tasks and for performing an aspect of the method according to the invention. If a multicore processor is comprised in the server, for example, a single core thereof can be allocated by the initial task, and further cores can be allocated by the method for detecting data patterns.

The one or more cores of the processor are further arranged to execute the finite automata according to a state transition table. In the state transition table a plurality of states are defined which at least comprise a start state and at least one accepting state. For every state of the state transition table, state transitions can be triggered by data symbols. Every single symbol of a finite symbol set can in principle trigger a different transition. However, in most cases, plural symbols trigger the same state transition.

The computer comprises a state transition register defining the state transition table. The computer accesses, for every state of the finite automata, the state transition register to determine the next state to which a transition is to be triggered upon a certain data symbol input to that state. This symbol is the symbol in the data stream received by the computer, in which data stream the data patterns are to be detected.

In a data symbol register data symbols are comprised. From the data symbol register the computer can determine, e.g. by comparing it with the data symbol register, whether a data symbol of the data stream can result in an accepting state of the finite automata. The data symbol register can therefor be a storage means wherein data symbols are comprised for the determining unit to determine thereof if a data symbol can result in an accepting state. All data symbols not resulting in an accepting state are comprised in a group.

If from the data symbol register the determining unit determines that a data symbol of the data stream is comprised in the group of symbols not resulting in an accepting state, it informs the execution unit to trigger a state transition to the start state of the finite automata. If the symbol is not comprised in the group, the execution unit triggers a state transition to a subsequent state, or to the same state, according to the state transition register. As such, the state transition table is executed in a conventional manner. Herewith the detection of the data patterns in the data stream continues.

In a further example the data symbol register is comprised in a lower level memory than the state transition table. Computers comprise a certain amount of memory. Not all memory is equal. Low level internal memory like processor registers and cache, can comprise less data. However, they are located closer to the execution core(s) of the computer and therefor have a lower latency. Main, higher level, memory can comprise more data but with higher latency. Disk storage can even comprise more data than the main memory but at the cost of an even higher latency. As such, there is a trade-off between storage amount and latency, i.e. capacity versus speed.

Storing the state transition register in a lower level of memory would increase speed and therefor finite automata walkthrough. However, the amount of data comprised therein is to much for low levels of memory and as such, slower, i.e. higher level, memory is to be used as a storage means.

In a network server according to an example of the present invention a data symbol register is presented. It requires a limited amount of storage as it only comprises the information to determine which symbols can not result in an accepting state. As size is limited, a higher level of memory can be used as a storage means for the data symbol register. Therefor latency significantly reduces for those group of symbols not resulting in an accepting state, and for these symbols a state transition to the start state is triggered in stead of a relative slow further state transition according to the state transition register in a.

In another example the lower level memory comprises a cache memory of the execution unit or of the network server. Except for the execution registers, the memory level with the lowest latency is the cache memory of the network server. As most network servers within telecommunication systems are multicore systems, they often comprise multi-level cache memories. With multi-level cache memory, the lower level is often dedicated to a single core, and the higher level(s) shared over multiple cores. In an example the data symbol register is comprised in a lower, single core dedicated cache level of the network server, and in another example to a higher, multicore allocated cache level of the network server.

In a further example the data symbol register comprises the group of data symbols not resulting in an accepting state. As the determining unit of the network server should be able to determine whether a data symbol of the data stream is a data symbol that can result in an accepting state of the finite automata, in an example it compares the data symbol of the data stream with the group of data symbols comprised in the data symbol register. If the comparison results in a hit, i.e. the data symbol is present therein, the execution unit can directly trigger the start state in stead of executing the rest of the finite automata according to the state transition register.

In yet another example the data symbol register comprises the plurality of data symbols, and the data symbols not resulting in an accepting state comprise a marked group in the data symbol register. Contrary to the previous example, the data symbol register is not restricted to the group of non accepting state resulting data symbols but to the complete set of data symbols that can occur in the data stream. For example all data symbols comprised in the extended ASCII alphabet. To this extent, within the data symbol register those data symbols that form the group of data symbols not resulting in an accepting state, are marked, flagged or identifiable likewise.

Upon determining whether the start state is to be triggered as a data symbol of the data stream can not result in an accepting state, the determining unit determines whether the data symbol of the data stream is marked in the data symbol register. If it finds such a marking of flag, it triggers the transition to the start state, if not, the finite automata is executed according to the state transition register.

In yet another example the network server further comprises a processing unit for processing the data stream in accordance with the detected data pattern. The processing unit can be instructed to act upon a matched data pattern. Depending on the initial or primary task of the network server, e.g. routing data, the processing unit can process the data for example by rerouting it to a different destination if a data pattern is detected. In Another example the data can be dropped from the data stream is a virus is recognized with a matching data pattern.

In a fourth aspect a telecommunications network is comprised of a network server according to any of the above described examples.

BRIEF DESCRIPTION OF THE DRAWINGS

The present invention will be further discussed in more detail below, using a number exemplary embodiments, with reference to the attached drawing, in which.

DETAILED DESCRIPTION

Figure 1:
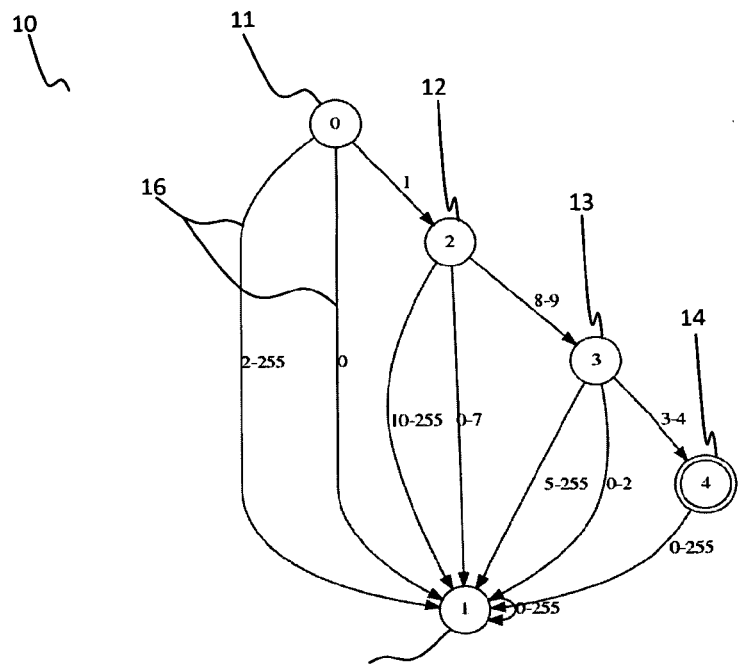
FIG. 1 illustrates a simplified finite automata comprising five states and state transitions between the states.

In FIG. 1 an example of a finite automata 10 is disclosed. Finite automata are used to identify data patterns in data streams, i.e. data traffic in telecommunications networks. Such identification can, for example, be applied in virus or spyware detection, content filtering, protocol matching etc.

The finite automata 10 shown in FIG. 1 comprises a plurality of states 11, 12, 13, 14, 15. These states may also be referred to as nodes. The data pattern matching process starts with the start state 11 of the finite automata 10. A start state can be defined as a state for which no entry action is present, i.e. for which there is no transition resulting in that state. In FIG. 1 state 11 is such a start state.

A data stream processed by the computer comprises a sequence of data symbols. These data symbols, or characters, are received by the computer and are used one at a time as input to the current state of the finite automata 10 for triggering a state transition 16. Upon the start of the pattern matching process the start state 11 is the current state. The first data symbol of the data stream determines the state transition 16. If for example the first data symbol is character 0 of the ASCII table, a state transition 16 is triggered from start state, state zero, 11 to the first state 15. However, if the first data symbol is character 1, a state transition is triggered to the second state 12. After the first state transition, the state to which the transition is triggered, i.e. state 12 or 15, is at that time the current state.

Then again, for the current state, i.e. state 12, the next data symbol of the data stream is used to determine the next state transition. If the next data symbol is character 5 a state transition is triggered to the first state 15, the same accounts for all characters in the range of 0-7 and all characters in the range 10-255. However, if the next data symbol in the data stream is character 8 or 9, a state transition is triggered to the third state 13. Then for the third data symbol a state transition is triggered to the first state for all characters 0-2 and 5-255. However, if the third data symbol is character 3 or 4, the fourth state 14 is entered. This is an accepting state, or final state and represented by a double circle.

When an accepting state is reached, the finite automata gives a match on a data pattern according to the finite automata. In this example, this is a match on the regular expression {1,[8-9],[3-4]}, being character 1 for the first data symbol, then either character 8 or 9 for the second data symbol and finally character 3 or 4 for the third data symbol.

Plural finite automata can exist giving rise to a plurality of data patterns for determining a plurality of protocols, data strings, viruses etc. The finite automata disclosed in FIG. 1 is a simplified version of a finite automata as there are only a certain amount of transitions and states shown. Actually a complete finite automata displays a state transition for every possible input data symbol. Therefor, for 256 possible data symbols of the ASCII character alphabet, every state of the finite automata has 256 state transitions. However, most state transitions trigger a transition to a same subsequent state and can therefor be shown as a range. In the example of FIG. 1 the state transition for state zero 11 to the first state 15 is comprised of 2 state transitions, one single state transition for character 0 and a ranged state transition for all characters in the range 2 to 255.

The finite automata shown in FIG. 1 has five states, including a single start state and a single accepting state. Between the states 256 state transitions exist, however, only some thereof are shown in a simplified way. This is however a visualisation of a the finite automata. The finite automata is present in a computer in a register in the form of a state transition table. These state transition tables are tables that show to what state a transition is triggered for a symbol to be input to the current state. This is a more formal and functional way to comprise the same regular expression as by a visualisation as shown in FIG. 1, which is a more diagram like representation. State transition registers are like truth tables defining the output for a state upon a certain input.

Figure 2:
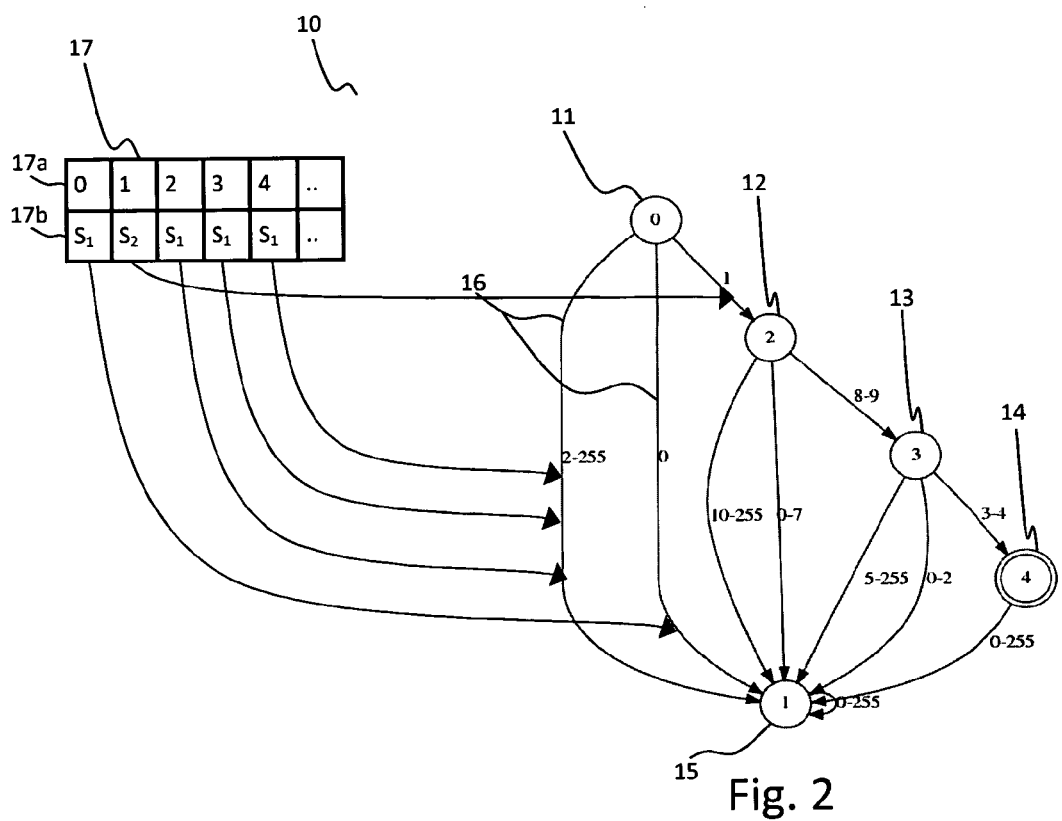
FIG. 2 illustrates the simplified finite automata further comprising a state transition table.

In FIG. 2 the state diagram 10 is disclosed of FIG. 1, however with a corresponding state transition table 17. The state transition table is a truth table like manner of storing information on what state transitions are to be triggered upon inputting certain data symbols. The simplified state transition table 17 disclosed in this figure comprises two rows 17a, 17b. The first row 17a comprises all data symbols of an alphabet, e.g. the finite set of 256 data symbols comprised in the extended ASCII table. Then for every data symbol in the second row 17b a corresponding state is presented. This is the state to which a state transition is triggered if the corresponding data symbol is the data symbol of the date stream. As such, for every state such information is comprised in the state transition table.

Plural state transition tables exist, e.g. one-, and two-dimensional state tables. The state transition table(s) are comprised in a memory of a computer executing a finite automata in the form of a state transition register. As such, the state transition register according to the invention can be defined as a state transition table 17 disclosed in FIG. 2.

Figure 3:
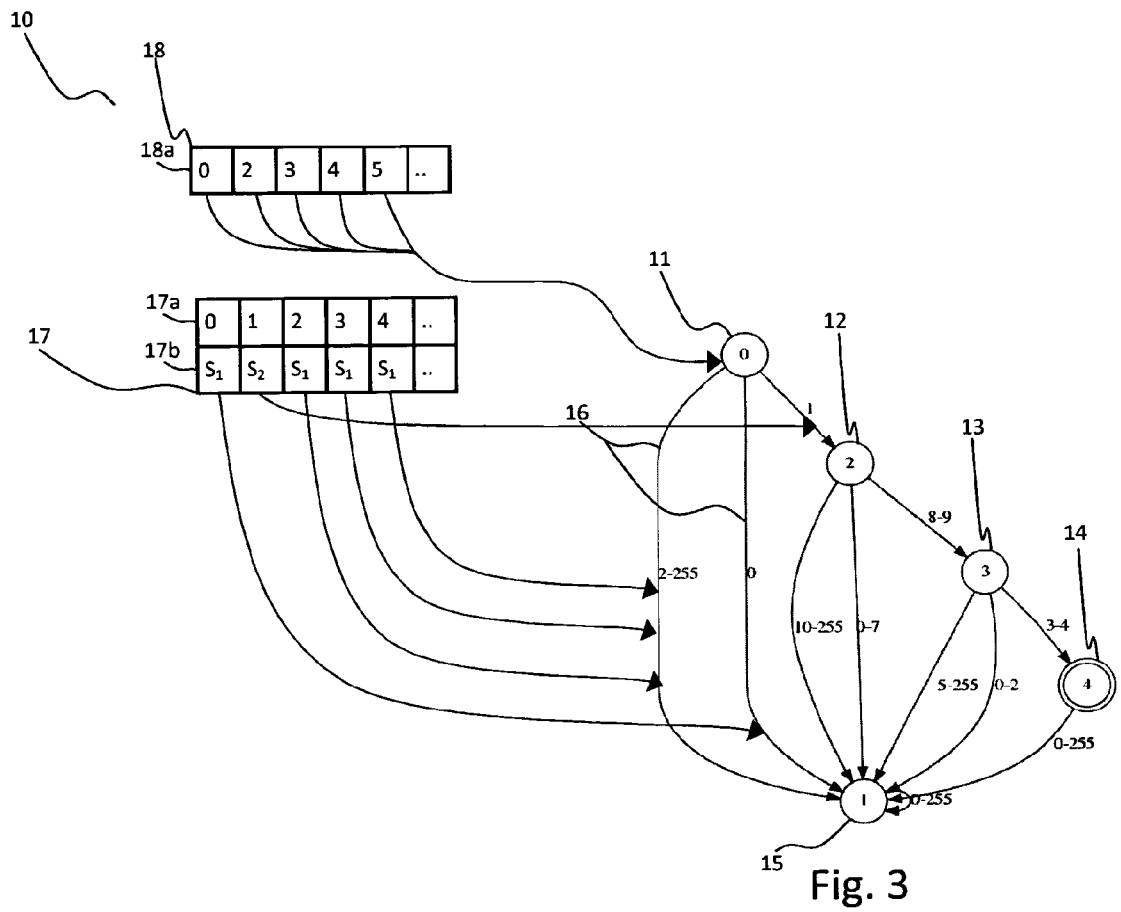
FIG. 3 illustrates the simplified finite automata further comprising a data symbol register.

FIG. 3 discloses the same finite automata 10 states and state transitions as disclosed in FIGS. 2 and 3. Also, the state transition register 17 is comprised of the state transitions 16, 17b for corresponding data symbols 17a. However, a further register is disclosed, being the data symbol register 18. The data symbol register 18 can be present in a plurality of manners. At least, the computer executing the method according to an aspect of the invention, is capable of determining from the data symbol register which data symbols 18a can not result in a state transition 16 to an accepting state 14 of the finite automata 10. From the state diagram 10 one can see that only certain symbols can result in the single accepting state 14. It is to be denoted that this is only a simplified version of a finite automata and that non simplified finite automata often comprises plural accepting states. For every state of the finite automata shown in FIG. 3 one can determine that a certain data symbol will result in a state transition to a subsequent state from which no further path to an accepting state exists.

For example, if the current state is state 11 and the data symbol of the data stream processed by the computer and input to that state 11 is data symbol, i.e. character, 0, a state transition 16 is triggered to the subsequent state 15. The same accounts for all data symbols in the range 2 to 255. From that state every further data symbol will result in a non forwarding step as the complete range of data symbols 0-255 will trigger a state transition to the same state 15. As such, state 15 will be the current state for all subsequent data symbols of the data stream until all data symbols are processed.

Those symbols triggering a transition to a state from which no further path to an accepting state exist can in an example be comprised in the data symbol register 18. The computer executing the method can access the data symbol register and compare the data symbol of the input data stream with the data symbols 18a stored in the register. If the comparison results in a hit, the start state 11 is triggered directly as further executing the finite automata would not result in an accepting state 14, and as such, in a match on a data pattern. If the data symbol of the data stream is not comprised in the data symbol register, the finite automata walkthrough if continued by accessing the state transition register 17, for determining a state transition for a certain data symbol accordingly.

Figure 4:
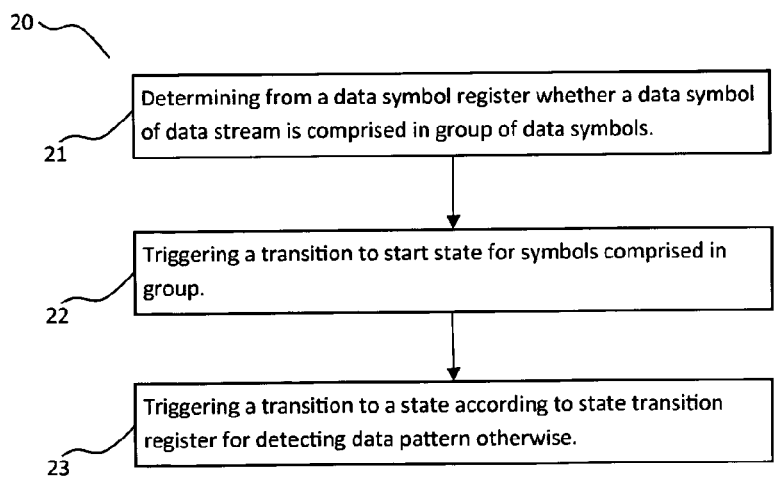
FIG. 4 illustrates a flow chart according to a first aspect of the invention.

In FIG. 4 the steps of an example 20 of the present invention are shown. These steps are the steps performed by a computer or more particular, a network server in a telecommunication network, for detecting data patterns in a data stream. The data stream can be any data stream on the telecommunications network or any data stream to be received by the computer. The data stream is a continuous flow headers and payload, of which the payload is not to be determined directly by the computer as it is not the sender nor receiver of the data. As such, the computer is only arranged to determine the headers of the data for routing it to its final destination.

However, often the payload of the data needs to be determined to decide on what the do with the data, e.g. amend, drop, reroute etc. An example of the present application provides an improved method to do so. It therefor executes a finite automata. The states of the finite automata at least comprise a start state and an accepting state. Between the states, state transitions can be triggered on the basis of characters or data symbols, being the data symbols comprised in the payload of the input data stream. These states, and the information what state transition is triggered upon what data symbols is comprised in a state transition table and stored in a memory of the computer.

In FIG. 4 the first step 21 of the method is to determine for a data symbol register whether a data symbol of the data stream is comprised in a group of data symbols. There are two types of data symbols to be recognised in the state transition table, those that can not result in an accepting state, e.g. the fourth state 14 of FIG. 1, and those that can result therein. The data symbols that can not result in an accepting state will never give a match on a data pattern. However, due to standard way of implementing finite automata, the finite automata has to be completed until all data symbols of the input data stream are processed. As such, even in an early stage, it can be certain that there will be no match on a data pattern, however, the finite automata still needs to continue its walkthrough as implemented finite automata do not have a void like programming function wherein the a return is triggered to the start condition if the end of the function is reached.

However, by storing information on which data symbols will never result in an accepting state, an improvement of a finite automata execution can be achieved. If the computer determines from a further register, the data symbol register, whether a data symbol is a data symbol of that group, it can execute a void like function by triggering a transition to the start state. Thereby the rest of the finite automata is skipped and the finite automata walkthrough is increased.

As such, in the next step 22 a state transition is triggered to the start state for those states that are comprised in the group, and in the next step 23 a state transition is triggered to a state according to the state transition register otherwise. So for those data symbols that are comprised in the group a void functionality is implemented by the method, and for the other data symbols the finite automata is executed in a normal manner, thereby continuing the data pattern matching process.

Figure 5:
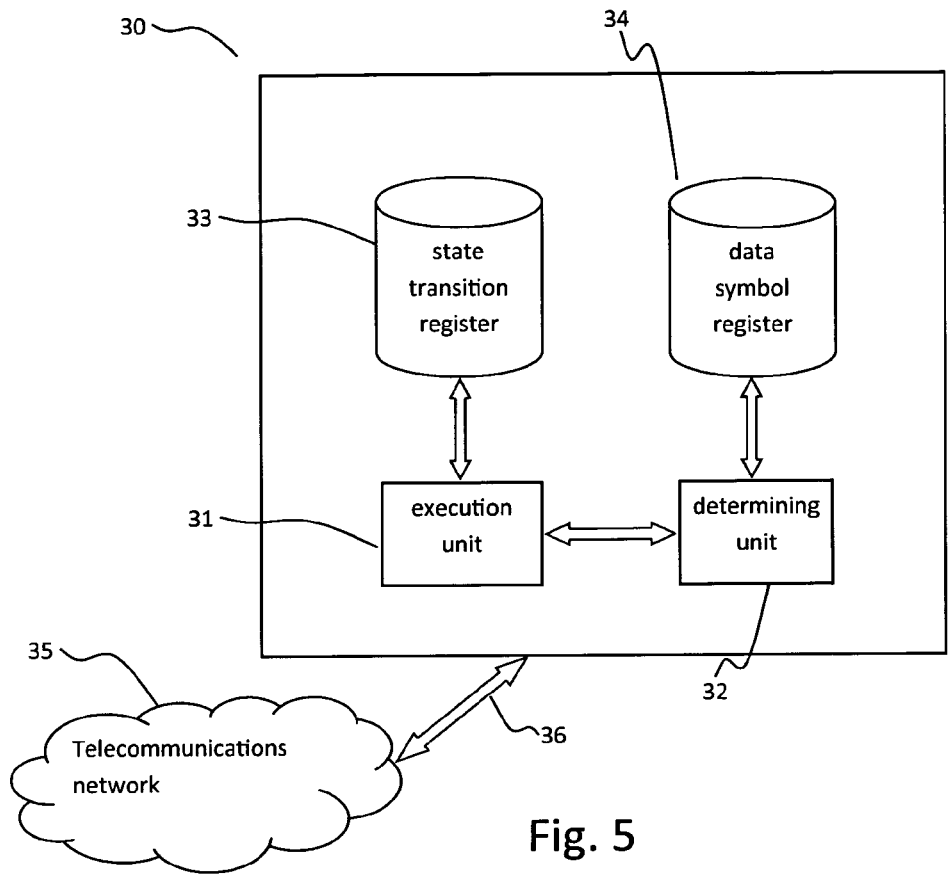
FIG. 5 illustrates a network server according to a further aspect of the invention.

FIG. 5 is a simplified representation of a computer 30 for executing the computer controlled method according to an aspect of the present invention. The computer can further comprise a plurality of units not disclosed in FIG. 3, but present in a computer, or more particular a network server or node in a telecommunications network. Therein a central execution unit 31 is to be recognised. The execution unit may be one of a single core or a multicore processor or Systems on a Chip, SoC.

The computer 30 further comprises a determining unit 32. The determining unit is arranged to determine whether a symbol of the data stream 36 of a network, in this figure illustrated as a telecommunications network 35, is comprised in a group of data symbols that can not result in an accepting state of the finite automata.

As such, for executing the finite automata, the computer 30 instructs the determining unit 32 to determine whether the next data symbol of the data stream 36 is comprised in the group. For determining whether it is part of the group, the determining unit accesses a register, i.e. the data symbol register 34, which comprises information on which symbols are comprised in the group. The determining unit 32 informs the execution unit 31 whether the execution process of the finite automata is to be altered. The execution of the finite automata will be altered if the data symbol of the data stream 36 processed at that time by the execution unit 31 is comprised in the group. Than the execution unit 31 will trigger a state transition to the start state of the finite automata, thereby ending, c.q. skipping the finite automata walkthrough.

If the determining unit 32 returns on the execution unit 31 with a miss on the comparison of the data symbol of the input stream 36 with the data symbols comprised in the group, the execution unit 31 will continue the finite automata walkthrough in a normal manner. No process will be altered. The finite automata walkthrough is executed accordingly by determining from the state transition register 33 which state transition is to be triggered by the processed data symbol of the data stream 36.

Figure 6:
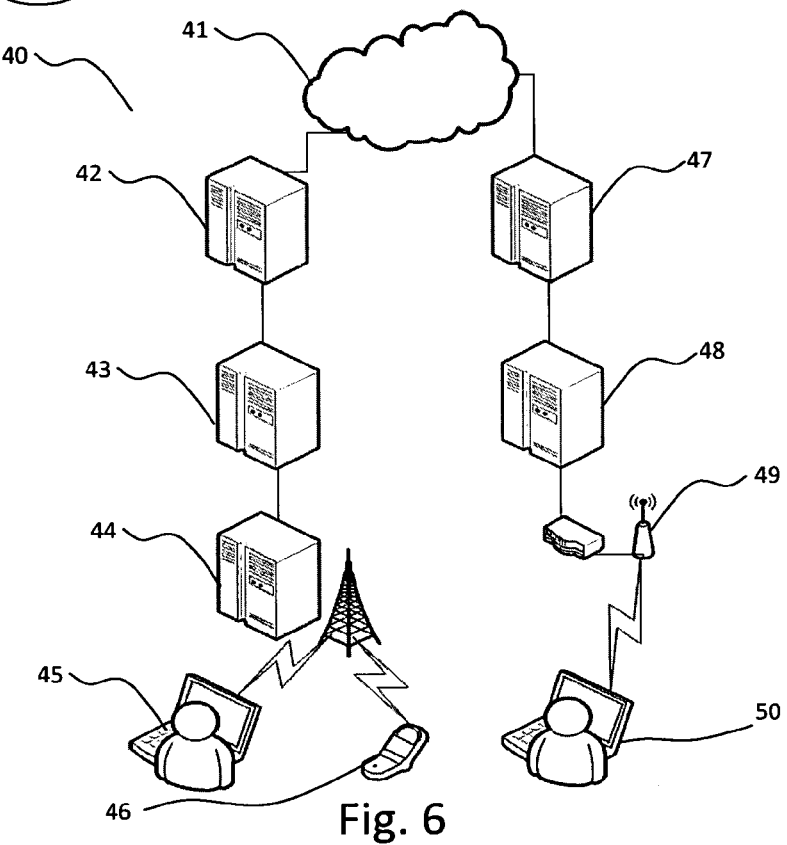
FIG. 6 illustrates a telecommunication network according to another aspect of the invention.

FIG. 6 shows a plurality of network servers or nodes 42, 43, 44, 47, 48 in a telecommunications network 40. Each network server is arranged and specifically capable of performing a certain task within the network. An example thereof is the gateway General Packet Radio Service, GPRS, Support Node, GGSN, denoted with reference number 42. The GGSN is a gateway responsible for connecting and routing data streams of a GPRS network with an external network such as the internet 41. The GGSN, in its function as a gateway, passes-through data stream. For the data packets comprised in the data stream the GGSN is at least aware of the destination, however most often not of the actual payload comprised in the packets.

For performing payload dependent processing, a network server such as a GGSN can be equipped with a determining unit 32 and a data symbol register 34 as illustrated in FIG. 4. As such, the network server is arranged, if arranged to comprise a state transition register, to execute a finite automata with an increased walkthrough speed.

FIG. 6 further shows several other network servers such as a Server GPRS Support Node, SGSN, arranged to deliver data packets from and to mobile stations within a certain area, and a Digital Subscriber Line Access Multiplexer, DSLAM, that aggregates the data of a certain amount of Digital Subscriber Line, DSL modems to further transport them over a single network link. Each of these servers can be arranged to perform the method according to an aspect of the invention by at least comprising the units illustrated in FIG. 5. The network server shown in FIG. 6 are however only shown as an illustration. The method according to an aspect of the invention is not restricted to those network servers shown in this figure, but can be performed in a plurality of network servers wherein a determining unit and a data symbol register can be defined.

The invention claimed is:

1. A computer-controlled method for detecting data pattern in a data stream received by a computer, said data stream comprising a plurality of data symbols, said computer executing a finite automata comprising a plurality of states, including a start state and at least one accepting state, and state transitions triggered by a data symbol according to a state transition register, said method comprising:
    determining, by said computer, from a data symbol register, comprised in a lower level memory having lower latency than said state transition register, whether a data symbol of said data stream is comprised in a group of data symbols not resulting in an accepting state;
    triggering, by said computer, a transition to said start state for data symbols comprised in said group of data symbols; and
    triggering, by said computer, a transition to a state according to said state transition register for detecting said data pattern otherwise.

2. The computer-controlled method of claim 1, wherein said data symbol register comprises said group of data symbols not resulting in the accepting state, and wherein said step of determining comprises determining whether the data symbol of said data stream is comprised in said data symbol register.

3. The computer-controlled method of claim 1, wherein said data symbol register comprises said plurality of data symbols, wherein said data symbols not resulting in the accepting state comprise a marked group in said data symbol register, and wherein said step of determining comprises determining whether the data symbol of said data stream is comprised in said marked group.

4. The computer-controlled method of claim 1, wherein said data stream is processed, by said computer, in accordance with said detected data pattern.

5. The computer-controlled method of claim 1, wherein said group of data symbols is generated, by said computer, to comprise data symbols in accordance with an application to be processed on said computer.

6. The computer-controlled method of claim 1, wherein said method is operated in a network server of a telecommunications system.

7. A non-transitory computer-readable medium comprising, stored thereupon, computer program code data arranged so that, when said computer program code data are executed by an electronic processing unit adapted to detect pattern in a data stream received by the electronic processing unit, said data stream comprising a plurality of data symbols, said electronic processing unit executing a finite automata comprising a plurality of states, including a start state and at least one accepting state, and state transitions triggered by a data symbol according to a state transition register are executed by said electronic processing unit, the computer program code data causes the electronic processing unit to:
    determine, from a data symbol register, comprised in a lower level memory having lower latency than said state transition register, whether a data symbol of said data stream is comprised in a group of data symbols not resulting in an accepting state;
    trigger a transition to said start state for data symbols comprised in said group of data symbols; and
    trigger a transition to a state according to said state transition register for detecting said data pattern otherwise.

8. A network server operating in a telecommunications network for detecting a data pattern in a data stream comprising a plurality of data symbols, said network server comprising:
    a central processing unit (CPU) coupled to a memory, the CPU comprising:
        a state transition register defining a finite automata comprising a plurality of states including a start state and at least one accepting state, and state transitions triggered by a data symbol according to said state transition register;
        a data symbol register, comprised in a lower level memory having lower latency than said state transition register and adapted to comprise data symbols;
        a determining circuit adapted to determine, from said data symbol register, whether a data symbol of said data stream is comprised in a group of data symbols not resulting in an accepting state; and
        an execution circuit adapted to trigger a state transition to said start state for data symbols comprised in said group of data symbols, and a state transition to a state according to said state transition register for detecting said data pattern otherwise.

9. The network server of claim 8, wherein said lower level memory comprises a cache memory of said execution circuit.

10. The network server of claim 8, wherein said lower level memory comprises a cache memory of said network server.

11. The network server of claim 8, wherein said data symbol register is adapted to comprise said group of data symbols not resulting in the accepting state.

12. The network server of claim 8, wherein said data symbol register is adapted to comprise said plurality of data symbols, such that said data symbols not resulting in the accepting state comprise a marked group in said data symbol register.

13. The network server of claim 8, further comprising a processing circuit adapted to process said data stream in accordance with said detected data pattern.

14. A telecommunications network comprising a network server of claim 8.

* * * * *